June 7, 1932. J. M. HARRISON 1,862,219
RADIATOR
Filed March 2, 1929
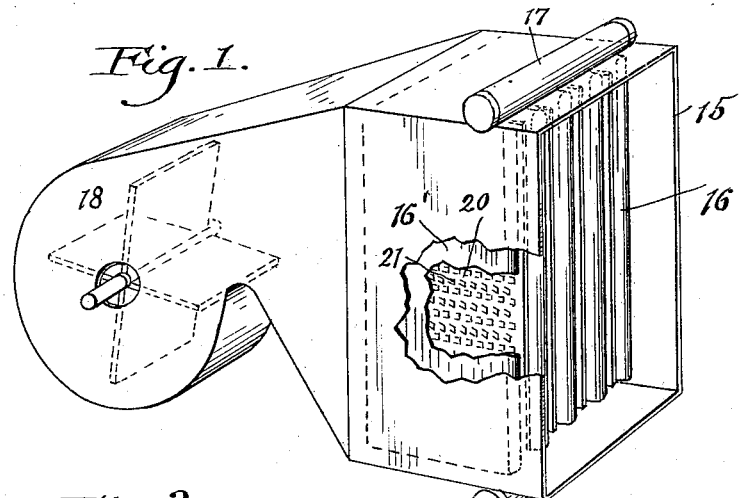
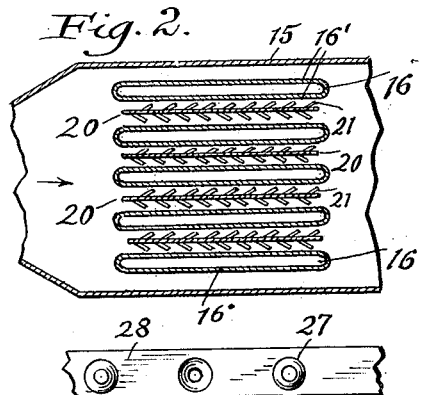
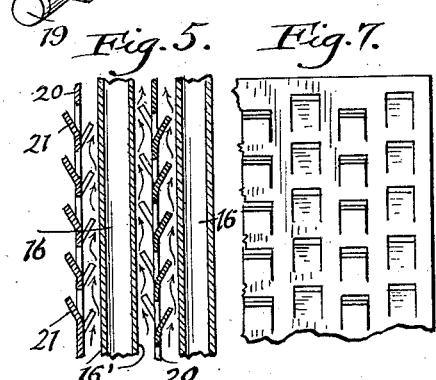
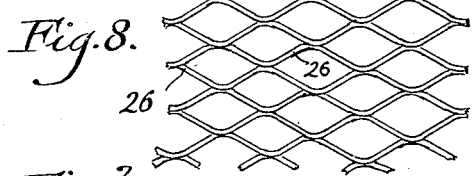
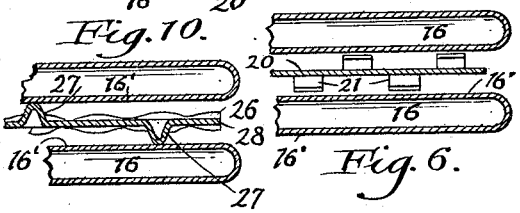
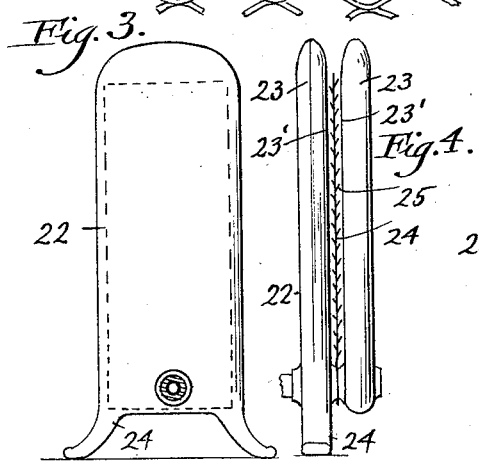
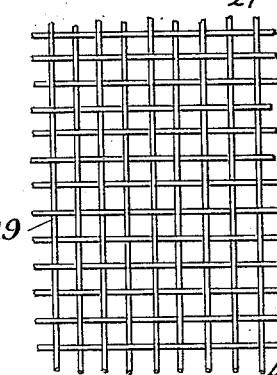
Inventor
James M. Harrison
Kwis Hudson & Kent
Attys.

Patented June 7, 1932

1,862,219

UNITED STATES PATENT OFFICE

JAMES M. HARRISON, OF CLEVELAND, OHIO

RADIATOR

Application filed March 2, 1929. Serial No. 344,038.

This invention relates to heat exchange devices, and more particularly to radiators adapted to be used with direct and indirect radiation systems.

Where fluid is brought into contact with heating surfaces for the purpose of heating the fluid, it is generally known that a layer or film of fluid of indefinite thickness, which is in direct contact with the heating surface tends to cling or adhere to this surface and to form a non-conductive covering which prevents heat from being readily transferred to the layers of fluid which are more remote from the heating surface. This adherence between the layer of fluid and the heating surface appears to be due largely to frictional resistance between the fluid and the surface, which causes this layer of fluid to lag while the more remote layers of fluid pass over this layer without being heated to the desired extent. The result of this phenomenon is a material decrease in the efficiency of a heat exchanger so that it becomes necessary to use large areas of heating surface to heat a fluid to a desired temperature. I have found that by breaking up or dispelling this substantially non-conductive layer or film, and causing all of the fluid to be heated to repeatedly come into direct contact with the heating surfaces, the efficiency of a heat exchanger will be greatly increased.

It is an object of this invention to provide a novel form of heat exchanger in which the rate of transfer of heat to the fluid to be heated will be greatly increased.

The invention may be further briefly summarized as consisting in certain novel arrangements and combinations of parts hereinafter described and set out in the appended claims.

In the accompanying sheet of drawing forming a part of this application,

Fig. 1 is a perspective view showing one form of heat exchanger constructed according to my invention;

Fig. 2 is a cross-sectional view of the heat exchanger shown in Fig. 1;

Fig. 3 is an end elevational view of another form of heat exchanger embodying my invention;

Fig. 4 is a fragmentary side elevational view of the heat exchanger shown in Fig. 3;

Figs. 5 and 6 are fragmentary views illustrating the principle of my invention;

Figs. 7, 8 and 9 are fragmentary views showing different forms of screens which may be used in carrying out my invention; and Fig. 10 is a fragmentary view illustrating one manner of spacing the screen between the heating elements.

Referring now in detail to the drawing in Fig. 1 of which I show my invention embodied in a heat exchanger of the type commonly used in indirect radiation systems. This heat exchanger comprises a casing 15, within which is arranged a group of spaced parallel heating elements 16. These elements may be of any desired shape, but are preferably hollow and provided with flat parallel heating surfaces 16', which will be termed prime heating surfaces.

For heating the elements they may be supplied with steam or other heating medium from a header 17 to which they are connected. A fan or blower 18 may be connected to the casing for forcing air or other fluid to be heated through the passages formed between adjacent heating elements. A header 19 may be connected to the heating elements for collecting and carrying away the heating medium which passes through the heat exchanger.

To increase the rate transfer of heat to the fluid to be heated, I provide screens or auxiliary heating surfaces 20 which are held between the opposed prime heating surfaces 16' of adjacent parallel elements 16 in any convenient way. These screens or auxiliary heating surfaces are preferably formed, as best shown in Figs. 5, 6 and 7, by stamping or punching sheets of metal to provide rows of outstanding lugs 21. As fluid passes through the heat exchanger these lugs act as deflectors which direct the fluid against the prime heating surfaces. When the fluid deflected by the lugs impinges against the prime heating surfaces, it acts to dispel or break up the layer or film of fluid which tends to cling to these heating surfaces. During the passage of fluid through the heat exchanger, its direction of flow is repeatedly changed by the lugs, thus bringing all of the fluid into direct contact with the prime heating surfaces thereby permitting the transfer of the maximum amount of heat to the fluid by convection.

In addition to heating the fluid by causing it to impinge against the prime heating surfaces, it is also heated by its contact with the auxiliary heating surface 20, which has been heated by energy radiated from the prime heating surfaces. Thus it will be seen that the screens 20 greatly facilitate the heating of the fluid by serving as deflectors for causing the fluid to come into direct contact with the prime heating surfaces, and also by serving as auxiliary heating surfaces which transfer to the fluid heat which has been radiated from the prime heating surfaces.

In Figs. 3 and 4, of the drawing, I show a radiator 22 of the type commonly used with direct systems of radiation in which fluid to be heated is caused to flow over the heating surfaces of the radiator by the action of gravity. The radiator 22 is composed of hollow sections 23 spaced to provide passages between adjacent sections for the flow of the fluid to be heated. The end sections of radiator 22 are preferably provided with legs 24 which support the radiator. The customary connections are provided at each end of the radiator to permit the flow of steam or other heating fluid through the hollow sections 23. To increase the rate of transfer of heat to the fluid, I provide a screen or auxiliary heating surface 24 between the opposed prime heating surfaces 23' of adjacent parallel sections 23. This auxiliary heating surface is similar to the auxiliary heating surface 20, already described, and functions in the same manner except that the flow of fluid through the passages between the sections is caused by gravity. The auxiliary heating surface 24 is clamped between sections 23, or held in place in any suitable manner, and is provided with outstanding lugs 25 which deflect the fluid against the prime heating surfaces so as to prevent the formation of a layer or film of heated fluid on these surfaces. The auxiliary heating surface 24 is heated by energy radiated from the prime heating surfaces and transfers this heat to the fluid which contacts with this surface in its passage through the heat exchanger.

To clearly illustrate the principle of my invention, I show in Figs. 5, 6 and 7 the approximate position of such auxiliary heating surfaces relative to the prime heating surfaces, and to illustrate the manner in which the fluid to be heated is deflected and made to impinge against the prime heating surface, I have used arrows in Fig. 5 to represent the approximate direction of flow of the fluid. As indicated by these arrows the direction of flow is repeatedly changed and the fluid directed against the prime heating surfaces thus preventing a layer of fluid from adhering to these surfaces and also causing all of the fluid to repeatedly come into contact with the prime heating surfaces.

While I have carefully described the manner in which the type of screen or auxiliary heating surface shown in Figs. 5, 6 and 7 functions, I have found that in actual practice it is not necessary to use a screen having pronounced deflecting lugs, but that similar results may be accomplished by the use of various kinds of screens. So far as I am aware, the only essential feature of the screen is that it be provided with a plurality of curved surfaces which will serve to deflect the fluid to be heated against the prime heating surfaces. As examples of different kinds of auxiliary heating surfaces which may be employed in carrying out my invention, I show in Fig. 8, a screen or auxiliary heating surface 26 which is made of expanded metal, and in Fig. 9 I show an auxiliary heating surface 29 constructed of wire screen. It is obvious that for spacing and holding the auxiliary heating surfaces between the prime heating surfaces any suitable means may be used, but if desired, the screens may be provided with a marginal portion 28, as shown in Fig. 8, and for spacing the screens between the prime heating surfaces spaced lugs 27 may be formed along this marginal portion as shown in Figs. 8 and 10.

It will now be readily understood that where auxiliary heating surfaces, such as I have shown and described, are used between prime heating surfaces, fluid flowing through the heat exchanger between the prime heating surfaces will be heated by being deflected against the prime heating surfaces, and will also receive heat from the auxiliary heating surfaces which have been heated by energy radiated from the prime heating surfaces. With this arrangement the rate of transfer of heat to the fluid to be heated is increased to such an extent that the area of prime heating surface may be greatly reduced, which permits a reduction in the size and weight of heat exchangers and also results in a saving of space.

For the purpose of illustration I have shown and described heat exchange apparatus in which heating surfaces are adapted to be heated by causing hot fluids to flow through the hollow elements, but it should be understood that the manner of supplying heat to the heating surfaces is not an essential feature of the invention, and heat may be supplied to these surfaces in any convenient way such as by direct firing or by waste heat.

While I have shown and described in detail various kinds and arrangements of apparatus, it should be understood that I do not limit my invention to the precise details and arrangements shown, but regard my invention as including such alterations and modifications as do not involve a departure from the spirit of the invention and scope of the appended claims.

Having thus described my invention, I claim:

1. In a heat exchanger, the combination of oppositely disposed heating surfaces having a passage therebetween for fluid to be heated, and means interposed between said surfaces and extending in spaced substantially parallel relation thereto, said means having angularly disposed portions for deflecting streams of said fluid against said surfaces.

2. In a heat exchanger, the combination of a prime heating surface, and an auxiliary heating surface extending in spaced substantially parallel relation thereto and heated by energy radiated from said prime surface, said auxiliary heating surface being provided with rows of angularly disposed sheared portions for deflecting fluid heated by said auxiliary surface against said prime surface.

3. In a heat exchanger, the combination of a prime heating surface, and means for deflecting fluid against said prime heating surface, said means comprising an auxiliary heating surface extending substantially parallel with said prime surface and adapted to be heated only by energy radiated from said prime surface.

4. In a heat exchanger, the combination of prime heating surfaces having a passage therebetween for fluid to be heated, and a screen interposed between and spaced from adjacent prime surfaces for deflecting said fluid against the latter and also forming an auxiliary heating surface adapted to receive heat radiated from said prime surfaces and to transfer said heat to said fluid, said screen comprising a metallic sheet having oppositely inclined deflecting portions outstanding from the surfaces thereof.

5. In a heat exchanger, the combination of a wall for separating two streams of fluid in heat exchange relation, and means extending substantially parallel with and in spaced relation to said wall and being provided with rows of sheared angularly disposed portions for deflecting one of said fluids against said wall to thereby prevent a layer of the fluid deflected from clinging thereto.

In testimony whereof, I hereunto affix my signature.

JAMES M. HARRISON.